(12) United States Patent
Sudre

(10) Patent No.: US 12,024,473 B2
(45) Date of Patent: Jul. 2, 2024

(54) THROUGH THICKNESS REINFORCEMENT

(71) Applicant: Raytheon Technologies Corporation, Farmington, CT (US)

(72) Inventor: Olivier H. Sudre, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 369 days.

(21) Appl. No.: 17/339,185

(22) Filed: Jun. 4, 2021

(65) Prior Publication Data

US 2022/0388912 A1 Dec. 8, 2022

(51) Int. Cl.
| | | |
|---|---|---|
| C04B 35/80 | (2006.01) |
| C04B 35/628 | (2006.01) |
| C04B 35/65 | (2006.01) |
| C04B 35/657 | (2006.01) |
| F01D 5/28 | (2006.01) |
| F01D 9/02 | (2006.01) |

(Continued)

(52) U.S. Cl.
CPC ........ *C04B 35/80* (2013.01); *C04B 35/62863* (2013.01); *C04B 35/62884* (2013.01); *C04B 35/652* (2013.01); *C04B 35/657* (2013.01); *F01D 5/284* (2013.01); *F01D 9/02* (2013.01); *F01D 11/00* (2013.01); *F23R 3/002* (2013.01); *C04B 2235/3826* (2013.01); *C04B 2235/5244* (2013.01); *C04B 2235/5252* (2013.01); *C04B 2235/614* (2013.01); *C04B 2235/616* (2013.01); *F05D 2220/32* (2013.01); *F05D 2240/12* (2013.01); *F05D 2240/30* (2013.01); *F05D 2240/35* (2013.01); *F05D 2240/55* (2013.01); *F05D 2300/20* (2013.01)

(58) Field of Classification Search
CPC .......................... C04B 35/80; C04B 35/62863
See application file for complete search history.

(56) References Cited

U.S. PATENT DOCUMENTS

| | | | |
|---|---|---|---|
| 6,280,550 B1 * | 8/2001 | Steibel | .................. C04B 35/565 |
| | | | 156/212 |
| 10,384,981 B2 | 8/2019 | Hall et al. | |
| 10,618,848 B2 | 4/2020 | Luthra et al. | |

(Continued)

OTHER PUBLICATIONS

W.- T. Chen, et al., "Directionally Solidified Boride and Carbide Eutectic Ceramics", from J. Am. Ceram. Soc., 99 [6], pp. 1837-1851 (2016).

(Continued)

*Primary Examiner* — Robert A Vetere
(74) *Attorney, Agent, or Firm* — Kinney & Lange, P.A.

(57) ABSTRACT

A method for making a ceramic matrix composite component includes densifying a fibrous preform of the component with a ceramic matrix to form an intermediate component; infiltrating a hole in the intermediate component with an infiltrate material comprising a solid and a metallic alloy whose reaction forms a carbide, silicide, boride or combination thereof, heating the infiltrate material to a temperature in excess of a melting point of the metallic alloy; and sequentially cooling regions of the hole starting from an interior end of the hole to the outer surface of the intermediate component to form a solidified through-thickness reinforcement element. The hole extends in a through-thickness direction and is open to an exterior surface of the intermediate component.

13 Claims, 3 Drawing Sheets

(51) Int. Cl.
*F01D 11/00* (2006.01)
*F23R 3/00* (2006.01)

(56) References Cited

U.S. PATENT DOCUMENTS

| | | | | |
|---|---|---|---|---|
| 2004/0192534 | A1* | 9/2004 | Nixon | C04B 35/80 501/95.2 |
| 2006/0283014 | A1* | 12/2006 | Subramanian | C04B 35/62868 29/889.7 |
| 2009/0214845 | A1* | 8/2009 | Corman | C04B 35/62868 428/689 |
| 2013/0184141 | A1* | 7/2013 | Ogasawara | C04B 41/009 501/154 |
| 2018/0312442 | A1* | 11/2018 | Shinavski | C04B 35/573 |
| 2019/0185384 | A1* | 6/2019 | Shim | C04B 35/657 |

OTHER PUBLICATIONS

Extended European Search Report for EP Application No. 22170120.4, dated Sep. 21, 2022, 7 pages.

* cited by examiner

THROUGH THICKNESS REINFORCEMENT

BACKGROUND

The present disclosure relates generally to ceramic matrix composite (CMC) components, and more particularly to a method of manufacturing ceramic matrix composite components for use in gas turbine engines.

Lightweight CMC is a highly desirable material for gas turbine engine applications. CMCs exhibit excellent physical, chemical, and mechanical properties at high temperatures and are particularly suited for producing hot section components for gas turbine engines. For example, CMC materials can be used for components such as turbine blades and vanes, seals or shrouds, and combustor panels. CMCs for turbine applications experience a range of failure mechanisms, such as in-plane crack propagation and interlaminar failure. Such failures are often the result of incomplete or partial densification of the CMC component. Improved CMCs are needed to increase the life of turbine components.

SUMMARY

In one aspect, a method for making a ceramic matrix composite component includes densifying a fibrous preform of the component with a ceramic matrix to form an intermediate component; infiltrating a hole in the intermediate component with an infiltrate material comprising a solid and a metallic alloy whose reaction forms a carbide, silicide, boride or combination thereof, heating the infiltrate material to a temperature in excess of a melting point of the metallic alloy; and sequentially cooling regions of the hole starting from an interior end of the hole to the outer surface of the intermediate component to form a solidified through-thickness reinforcement element. The hole extends in a through-thickness direction and is open to an exterior surface of the intermediate component.

In another aspect, a ceramic matrix composite component includes a ceramic matrix, a plurality of ceramic fibers embedded in the ceramic matrix, and a reinforcement element disposed through the ceramic matrix and ceramic fibers. The reinforcement element comprises a carbide, silicide, boride or combination thereof.

The present summary is provided only by way of example, and not limitation. Other aspects of the present disclosure will be appreciated in view of the entirety of the present disclosure, including the entire text, claims and accompanying figures.

Figure 1:
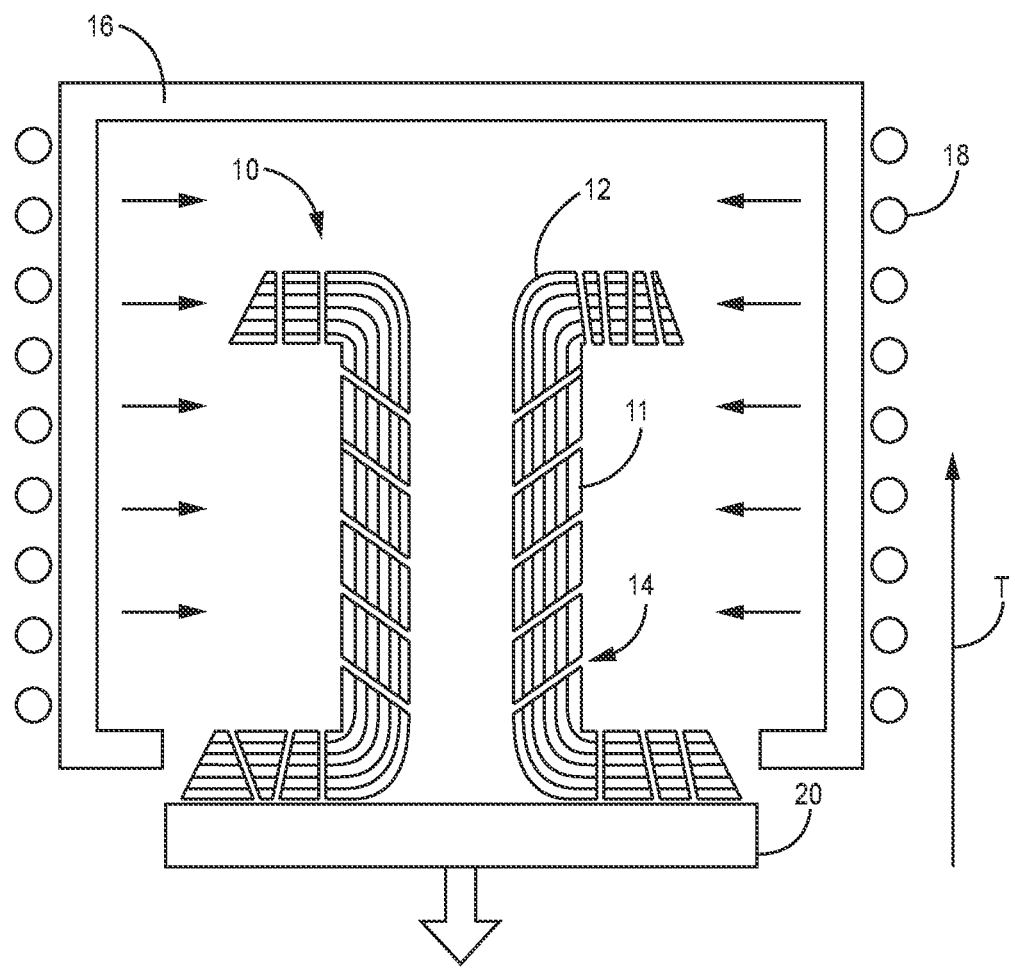
FIG. 1 is a cross-sectional view of a CMC component undergoing a heating and cooling treatment to form reinforcement elements.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Reinforcement elements formed in a recrystallization process and provided in a through-thickness orientation of a CMC component can enhance interlaminar properties to reduce in-plane crack propagation and interlaminar failure. As disclosed herein, reinforcement elements can be formed by providing holes in a CMC component, filling those holes with a solid and a metallic alloy whose reaction forms a carbide, silicide, boride or combination thereof, and recrystallizing the material in the holes by moving the CMC component through a temperature gradient. For example, holes can be filled with a material composition provided to form a eutectic, polycrystalline, or single crystal ceramic. In one embodiment described herein, holes can be filled with a molten silicon-based material in the presence of a carbon source. Benefits of the disclosed method include through-thickness reinforcement of the CMC component, reduction of residual silicon and avoidance of trapping silicon in the CMC component, and improved densification of the CMC component. CMC components can include turbine components operating at high temperatures, such as turbine blades, vanes, seals or shrouds, and combustor panels, among others.

Figure 2A:
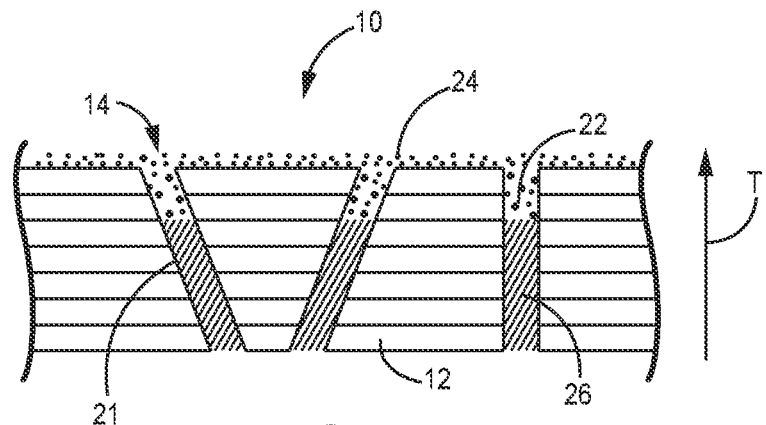
FIG. 2A is a cross-sectional view of a portion of the CMC component of FIG. 1 undergoing a heating and cooling treatment to form reinforcement elements.
Figure 2B:
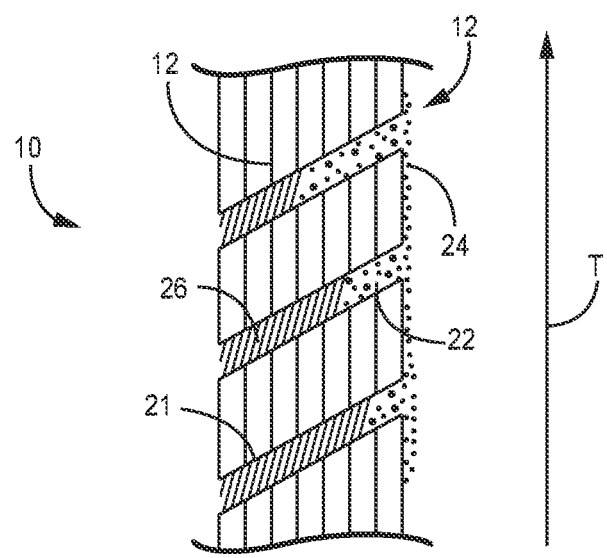
FIG. 2B is a cross-sectional view of another portion of the CMC component of FIG. 1 undergoing a heating and cooling treatment to form reinforcement elements.

FIG. 1 is a cross-sectional view of a CMC component undergoing a heating and cooling treatment to form reinforcement elements in the CMC component. FIGS. 2A and 2B are cross-sectional views of different portions of the CMC component of FIG. 1 undergoing the heating and cooling treatment to form reinforcement elements. FIGS. 1, 2A, and 2B are discussed together. FIG. 1 shows intermediate component 10 (with outer surface 11, densified fiber layers 12, and holes 14), furnace 16, heating elements 18, platform 20, and temperature gradient T. FIGS. 2A and 2B show intermediate component 10 with outer surface 11, densified fiber layers 12, holes 14, interphase coating 21, infiltrate material 22, surface carbon source 24, and solidified reinforcement element 26, alongside temperature gradient T. As illustrated in FIG. 1, intermediate component 10 can be a turbine vane. Intermediate component 10 is not limited to the structure illustrated and can include, for example combustor liners, blades, seals, and other CMC components in a gas turbine engine. Although FIGS. 2A and 2B are described hereinafter as illustrating different regions of the same intermediate component 10, other embodiments can encompass distinct components at differing orientations.

Intermediate component 10 can be formed from a fiber-based ceramic preform containing fibers or fiber tows, which can be woven, non-woven, braided, or selectively placed. As illustrated in FIGS. 1, 2A, and 2B, intermediate component 10 can be formed from a plurality of two-dimensional woven or braided fiber layers 12 (i.e., laminated structure). In other examples, intermediate component 10 can be formed from a three-dimensionally woven fiber preform or a combination of three-dimensional and two-dimensional layered fiber bodies. Exemplary fiber materials can include silicon carbide (SiC), carbon (C), silicon oxycarbide (SiOC), silicon nitride ($Si_3N_4$), silicon carbonitride (SiCN), hafnium carbide (HfC), tantalum carbide (TaC), silicon borocarbide (SiBC), silicon borocarbonitride (SiBCN), and silicon aluminum carbon nitride (SiAlCN).

Interfacial or interphase coatings such as pyrocarbon or boron nitride alone or in combination with other coatings can be applied to the fibers or fiber tows to help prevent matrix cracking from penetrating fibers and help protect against environmental degradation in corrosive environments. Interphase coatings can be applied to fibers or fiber tows prior to a fiber layup process or after the fibers have been assembled into the component preform. Interphase coatings can be applied, for example, by chemical vapor infiltration (CVI) prior to densification of the fiber preform.

The fiber preform can be densified with a ceramic matrix. The ceramic matrix can be formed via a process of CVI, melt infiltration, slurry infiltration of ceramic particles, or other known densification processes, and combinations thereof. Exemplary matrix materials include silicon carbide (SiC), other carbides such as $B_4C$, HfC, ZrC, and combinations thereof.

Holes 14 can be formed prior to densification of the fiber preform. Holes 14 can be formed using methods known in the art, for example, needling, stitching, drilling, removal of fibers, and placement of fugitive materials (e.g., pins or fibers) which can be removed during or following the densification process. The process of forming holes 14 may be assisted by vibration or liquid to minimize damage to the woven preform by pushing fibers away, for example, from the pin, rather than breaking fibers. In some examples, holes 14 formed prior to densification can provide channels to improve infiltration of matrix material to inner portions of the preform during a densification process. In some embodiments, holes 14 can be partially filled with matrix material during densification of the preform.

In alternative examples, holes 14 can be formed after densification of the fiber preform. For example, holes 14 can be drilled via laser drilling, ultrasonic drilling, electrical discharge machining (EDM), or other known methods, after the fiber preform has been fully densified.

Holes 14 can have a diameter ranging from approximately 50 microns to several millimeters. Preferably, holes 14 can have a diameter ranging from approximately 300 microns to 1 millimeter. The size of holes 14 can be determined based on CVI, particle infiltration, and melt infiltration conditions. The size of holes 14 is large enough to remain open after densification of the matrix by chemical vapor infiltration. For example, holes 14 are typically larger than 50 microns. The size of holes 14 can be selected to facilitate the infiltration of the carbon-bearing compound. Preferably, the size of holes 14 can be smaller (e.g., 50-100 microns) if the carbon source is deposited by vapor phase but larger if powder slurries are used (e.g., >300 microns).

Holes 14 can be distributed through one or more regions of intermediate component 10 with a desired density to provide sufficient reinforcement of the final CMC component and/or improve densification of the fiber preform. It is preferable to keep the size of the holes small as to keep the microstructure as homogeneous as possible. A density and size of holes should be such that the reinforcement phase represents 5 vol. % or more of the composite.

Holes 14 can be substantially cylindrical or any shape. The shapes of holes 14 can be determined, for example, by a shape of a fugitive material or opening left by the removal of fibers, fiber tows, or fugitive material.

Holes 14 extend in a through-thickness direction in intermediate component 10. Holes 14 can extend through a full thickness or a partial thickness of intermediate component 10. Holes 14 extend through multiple woven fiber layers 12 as illustrated in FIG. 1 to reduce in-plane crack propagation and interlaminar failure when provided with solidified reinforcement elements 26. Holes 14 can open to outer surface 11 of intermediate component 10.

Holes 14 can be oriented substantially vertically or angled in a vertical direction. For example, holes 14 can be oriented between 0 degrees and 45 degrees with respect to a bottom portion of intermediate component 10 as oriented in furnace 16. As illustrated in FIG. 1, the bottom portion of the intermediate component 10 is the portion of intermediate component 10 contacting platform 20. The bottom portion of intermediate component 10 is determined based on the orientation of intermediate component 10 in furnace 16. Platform 20 can be used to remove intermediate component 10 from furnace 16 during the recrystallization process. As will be discussed further below, the vertical or angled orientation of holes 14 allows molten silicon to migrate upwards toward outer surface 11 of intermediate component 10 during the recrystallization process.

Holes 14 can be filled with infiltrate material 22 following full densification of the fiber preform. Infiltrate material 22 can include a solid and a metallic alloy whose reaction forms a carbide, silicide, boride or combination thereof. For example, infiltrate material 22 can include a silicon-based material and a carbon source. The carbon source can be provided to holes 14 by a process of slurry infiltration or can be deposited as a coating on the surface of holes via a vapor phase process or combinations thereof. The silicon-based material can be provided to holes 14 by melt infiltration. In some examples, surfaces of holes 14 can be coated with one or more interphase coatings 21 prior to infiltration. For example, surfaces of holes 14 can be coated with a boron nitride coating via CVI. Interphase coating 21 can help protect against environmental degradation of the CMC component in corrosive environments. A boron nitride coating in the hole could also guide the melt and recrystallization process since the silicon melt does not react with boron nitride.

The carbon source can be deposited in holes 14 prior to infiltration with the molten silicon-based material. Holes 14 can be infiltrated with a liquid slurry including powders of carbon, silicon carbide or other silicides, and combinations thereof. The powders can be deposited in hole 14 through the length of hole 14 or thickness of intermediate component 10. In some examples, the carbon source material may include a dopant, such as aluminum, boron, chromium, hafnium, iron, molybdenum, niobium, rare earth metals, scandium, tantalum, titanium, tungsten, vanadium, yttrium, zirconium, or a combination thereof to reduce the melting point of the silicon-based infiltration material or to increase the solubility of carbon in the melt. In some examples, the liquid slurry can include binders or ceramic precursors. The infiltration can be assisted by pressure or vacuum using methods known in the art.

The size of the powder materials can vary depending on the diameter of hole 14. The liquid slurry can be poured or injected into holes 14. In some examples intermediate component 10 can be dipped in the liquid slurry to allow holes 14 to be filled with the liquid slurry or for holes 14 to pick up the powder materials of the liquid slurry. In other examples, a combination of methods can be used to deliver the slurry to the holes 14 in alternative steps or to different locations of intermediate component 10. The liquid can be aqueous-based, or an alcohol- or solvent-based non-aqueous fluid that is chemically compatible with intermediate component 10 and powder materials. The liquid can be removed through a single or iterative vacuum and/or drying process prior to melt infiltration.

Following deposition of the carbon source, holes 14 are infiltrated with a molten silicon-based material such as silicon or a silicon alloy. Exemplary silicon alloys include alloys of silicon with aluminum, boron, chromium, hafnium, iron, molybdenum, niobium, rare earth metals, scandium, tantalum, titanium, tungsten, vanadium, yttrium, zirconium, or a combination thereof. Rare earth metals include the lanthanides (elements 57-71) as well as scandium and yttrium. Yttrium, for example, can be provided to form a silicide having a higher melting temperature, which can be beneficial for components operating at higher operating temperatures.

Melt infiltration can be conducted locally (within holes 14) or for the full intermediate component 10 depending on the pattern, size, and/or density of holes 14.

The silicon-based material can react with the carbon source to form silicon carbide and silicides in holes 14. Residual unreacted silicon can remain in holes 14 following melt infiltration. The amount of residual silicon can be controlled by adjusting the amount of available carbon prior to melt infiltration. Preferably, the amount of residual silicon is sufficient to provide a continuous or connected phase of silicon through hole 14 such that a liquid front can move unimpeded through hole 14 upon re-melting. It is desirable to react or remove all residual silicon from hole 14.

Following infiltration of hole 14, intermediate component 10 is placed in furnace 16. Furnace 16 can have a traveling heat zone similar to single crystal growth furnaces known in the art. A temperature gradient can be formed with temperatures increasing from the bottom of furnace 16 to the top or only a center region is held at higher temperature as to limit possible side reaction or microstructure evolution in other regions of the component 10. Infiltrate material 22 can be heated in holes 14 to a temperature in excess of the melting temperature of the silicon-based infiltrate material. The melting temperature of the silicon-based infiltrate material is defined as the temperature required to melt one or more components of the silicon-based infiltrate material. Heating can cause the silicon to melt and react with the carbon source to form silicon carbide. In some examples, portions of intermediate component 10 are sequentially exposed to temperatures greater than or equal to 1300° C., greater than or equal to 1400° C., or greater than or equal to 1500° C. The temperature may be less than 2000° C. The temperature may only be limited by the thermal stability of other elements of the composite for example, the fiber and interphase(s).

Intermediate component 10 can be slowly lowered from furnace 16 on platform 20. As intermediate component 10 is lowered from furnace 16, the molten silicon carbide in holes 14 cools and recrystallizes while the unreacted melted residual silicon front moves upward through holes 14 toward outer surface 11 of intermediate component 10. Regions of holes 14 are sequentially cooled from an inner end of hole 14 to an exit of hole 14 at outer surface 11 of intermediate component 10. A melt front of unreacted residual silicon gradually moves toward outer surface 11 and out of hole 14 as silicon carbide is recrystallized and solidified in hole 14. Holes 14 are oriented with respect to the thermal gradient direction so as to allow the melt to progressively move through temperature gradient in hole 14 and not be trapped in holes 14. In some examples, the residual silicon can react with carbon source 24 provided at outer surface 11 to form silicon carbide in the outer portion and exit of hole 14. Surface carbon source 24 can be, for example, a graphite coating. Residual solidified silicon or silicon carbide formed on outer surface 11 can be removed in a post-processing step.

Holes 14 can be cooled at a rate of 100 microns/min. to 10 mm/min. to recrystallize the silicon carbide. The speed of crystallization depends on dopants and speed of dissolution of the carbon-bearing species ahead of the crystallization front. It also determines the size of the crystal. Slower speeds will grow large crystals. The silicon carbide is recrystallized to form solidified reinforcement elements 26. Reinforcement elements 26 can include silicon carbide crystals with a size of 20 micrometers. The average crystal size of the recrystallized silicon carbide can be greater than the average crystal size of the original ceramic matrix in intermediate component 10. The size of the crystal depends on the rate of recrystallization. The larger grain size provides improved reinforcement and improved creep resistance. The resulting reinforcement element 26 can be polycrystalline, eutectic, or a single crystal ceramic.

Although, FIG. 1 illustrates a process of removing intermediate component 10 from furnace 16, other methods of providing heating and successive or sequential cooling of holes 14 can be used.

The final CMC component has a ceramic matrix, a plurality of ceramic fibers embedded in the ceramic matrix, and a plurality of reinforcement elements 26 disposed through the ceramic matrix and ceramic fibers. Reinforcement elements 26 provide through-thickness reinforcement of the CMC component, which can enhance interlaminar properties of the CMC component.

Figure 3:
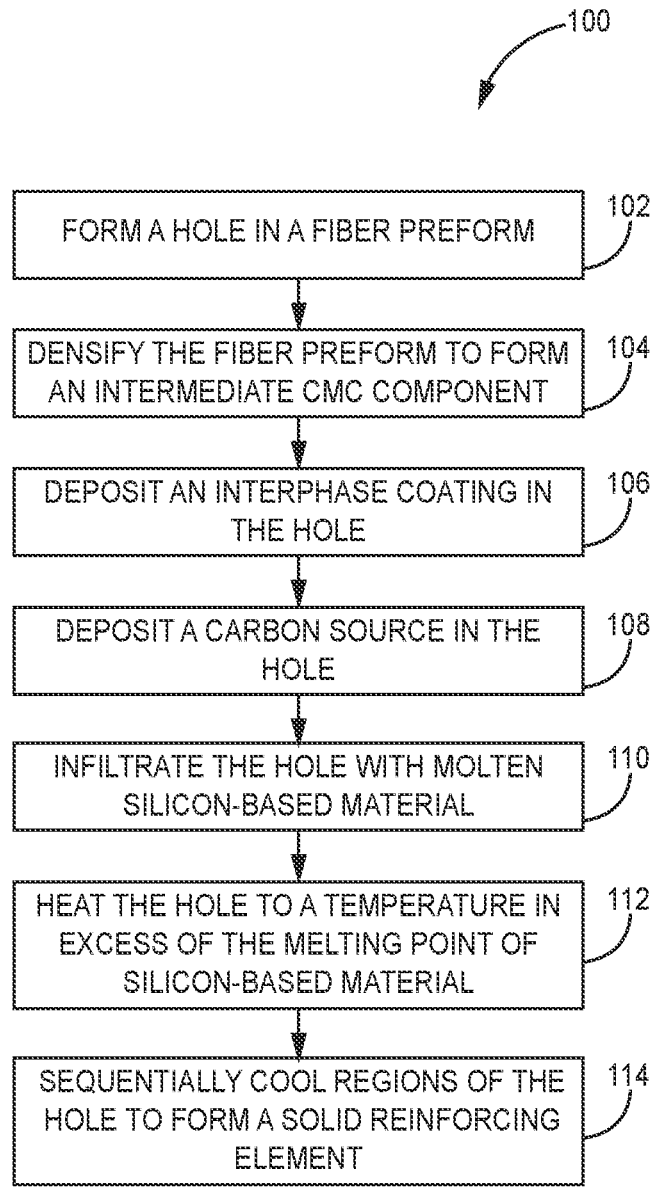
FIG. 3 is a flow chart of a method for forming reinforcement elements in a CMC component.

FIG. 3 is a flow chart of method 100 for forming reinforcement elements in a CMC component according to the methods previously disclosed. Holes 14 are formed in a fiber preform (step 102). The fiber preform is densified with a ceramic matrix to form intermediate component 10 (step 104). In alternative embodiments, holes 14 can be formed after densification of the fiber preform. Interphase coating 21 can optionally be applied to surfaces of holes 14 (step 106). Holes 14 are infiltrated with an infiltrate material 22 in steps 108 and 110. A carbon source can be deposited in holes 14 via slurry infiltration (step 108) or by depositing a carbon coating by vapor phase and a molten silicon-based material can subsequently fill holes 14 via a melt infiltration process (step 110). Infiltrate material 22 is subsequently heated in holes 14 to a temperature in excess of the melting point of the silicon-based material (step 112) causing the molten silicon-based material to re-melt and react with the carbon source to form silicon carbide. Regions of holes 14 are sequentially cooled from an inner end of hole 14 to an exit of hole 14 at outer surface 11 of intermediate component 10 (step 114) to recrystallize the silicon carbide and form solidified reinforcement elements 26.

Reinforcement elements 26 can enhance interlaminar properties to reduce in-plane crack propagation and interlaminar failure of CMC components. Additionally, the disclosed methods can be used to reduce residual silicon in the CMC component, avoid trapping silicon in the CMC component, and improve densification of the CMC component.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

DISCUSSION OF POSSIBLE EMBODIMENTS

The following are non-exclusive descriptions of possible embodiments of the present invention.

A method for making a ceramic matrix composite component includes densifying a fibrous preform of the component with a ceramic matrix to form an intermediate component; infiltrating a hole in the intermediate component with an infiltrate material comprising a solid and a metallic alloy whose reaction forms a carbide, silicide, boride or combination thereof, heating the infiltrate material to a temperature in excess of a melting point of the metallic alloy; and sequentially cooling regions of the hole starting from an interior end of the hole to the outer surface of the intermediate component to form a solidified through-thickness reinforcement element. The hole extends in a through-thickness direction and is open to an exterior surface of the intermediate component.

The method of the preceding paragraph can optionally include, additionally and/or alternatively, any one or more of the following features, configurations, additional components, and/or steps:

The method of the preceding paragraph, wherein sequentially cooling regions of the hole comprises moving the intermediate component through a temperature gradient.

The method of any of the preceding paragraphs, wherein sequentially cooling regions of the heated hole results in recrystallization of the infiltrate material.

The method of any of the preceding paragraphs, wherein an average crystal size of the solidified through-thickness reinforcement element is greater than an average crystal size of the ceramic matrix.

The method of any of the preceding paragraphs, wherein the through-thickness reinforcement element is a polycrystalline, eutectic, or single crystal ceramic.

The method of any of the preceding paragraphs, wherein the infiltrate material comprises a silicon-based material and a carbon source, and wherein the silicon-based material reacts with the carbon source to form silicon carbide when the infiltrate material is heated to a temperature in excess of a melting point of the silicon-based material.

The method of any of the preceding paragraphs, wherein infiltrating the hole comprises infiltrating with a molten silicon-based material.

The method of any of the preceding paragraphs, wherein the molten silicon-based material is a silicon alloy.

The method of any of the preceding paragraphs, wherein infiltrating the hole comprises infiltrating with a slurry containing the carbon source to deposit the carbon source in the hole.

The method of any of the preceding paragraphs, wherein infiltrating the hole comprises depositing a carbon source on a surface of the hole via a vapor phase deposition process.

The method of any of the preceding paragraphs, wherein the infiltrate material comprises aluminum, boron, chromium, hafnium, iron, molybdenum, niobium, rare earth metals, scandium, tantalum, titanium, tungsten, vanadium, yttrium, zirconium, or a combination thereof.

The method of any of the preceding paragraphs, and further comprising depositing a carbon source on the exterior surface of the intermediate component.

The method of any of the preceding paragraphs, and further comprising forming the hole in the fibrous preform.

A ceramic matrix composite component includes a ceramic matrix, a plurality of ceramic fibers embedded in the ceramic matrix, and a reinforcement element disposed through the ceramic matrix and ceramic fibers. The reinforcement element comprises a carbide, silicide, boride or combination thereof.

The ceramic matrix composite component of the preceding paragraph can optionally include, additionally and/or alternatively, any one or more of the following features, configurations, and/or additional components:

The ceramic matrix composite component of the preceding paragraph, wherein the reinforcement element is a polycrystalline, eutectic, or single crystal ceramic.

The ceramic matrix composite component of any of the preceding paragraphs, wherein the reinforcement element comprises silicon carbide.

The ceramic matrix composite component of any of the preceding paragraphs, wherein the reinforcement element extends through a thickness of the component.

The ceramic matrix composite component of any of the preceding paragraphs, wherein the ceramic fibers of the plurality of ceramic fibers are arranged in woven layers and wherein the reinforcement element extends through a plurality of woven layers.

The ceramic matrix composite component of any of the preceding paragraphs, wherein an interphase material is disposed between the reinforcement element and the matrix.

The ceramic matrix composite of any of the preceding paragraphs, further comprising a plurality of reinforcement elements selectively located in the ceramic matrix composite component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for making a ceramic matrix composite component, the method comprising:
   densifying a fibrous preform of the component with a ceramic matrix to form an intermediate component;
   infiltrating a hole in the intermediate component with an infiltrate material comprising a molten silicon-based metallic alloy and a solid whose reaction forms a carbide, silicide, boride or combination thereof, wherein the hole extends in a through-thickness direction and is open to an outer surface of the intermediate component;
   heating the infiltrate material to a temperature in excess of a melting point of the silicon-based metallic alloy to remelt the silicon-based metallic alloy; and sequentially cooling regions of the hole starting from an interior end of the hole to the outer surface of the intermediate component to form a solidified through-thickness reinforcement element, wherein sequential cooling follows heating the infiltrate material;

wherein residual unreacted silicon remains in the hole following infiltrating a hole in the intermediate component with the infiltrate material, and wherein the unreacted residual silicon is melted when the infiltrate material is heated and moves outward through the hole toward the outer surface during sequential cooling.

2. The method of claim 1, wherein sequentially cooling regions of the hole comprises moving the intermediate component through a temperature gradient.

3. The method of claim 2, wherein sequentially cooling regions of the heated hole results in recrystallization of the infiltrate material.

4. The method of claim 3, wherein an average crystal size of the solidified through-thickness reinforcement element is greater than an average crystal size of the ceramic matrix.

5. The method of claim 3, wherein the through-thickness reinforcement element is a polycrystalline, eutectic, or single crystal ceramic.

6. The method of claim 2, wherein the infiltrate material comprises a carbon source, and wherein the silicon-based metallic alloy reacts with the carbon source to form silicon carbide when the infiltrate material is heated to a temperature in excess of a melting point of the silicon-based metallic alloy.

7. The method of claim 6, wherein infiltrating the hole comprises infiltrating with a slurry containing the carbon source to deposit the carbon source in the hole.

8. The method of claim 1, wherein infiltrating the hole comprises depositing a carbon source on a surface of the hole via a vapor phase deposition process.

9. The method of claim 1, wherein the infiltrate material comprises aluminum, boron, chromium, hafnium, iron, molybdenum, niobium, rare earth metals, scandium, tantalum, titanium, tungsten, vanadium, yttrium, zirconium, or a combination thereof.

10. The method of claim 1, and further comprising depositing a carbon source on the outer surface of the intermediate component.

11. The method of claim 1, and further comprising forming the hole in the fibrous preform.

12. The method of claim 1, and further comprising depositing an interphase coating on surfaces of the hole.

13. The method of claim 1, wherein the residual silicon reacts with a carbon source provided on the outer surface of the intermediate component.

* * * * *